(12) United States Patent
Pawar et al.

(10) Patent No.: US 10,999,117 B2
(45) Date of Patent: *May 4, 2021

(54) APPARATUSES FOR DMRS DESIGN OR PROCESSING FOR GUARD INTERVAL OR ZERO TAIL DFT SPREAD OFDM SYSTEMS

(71) Applicant: APPLE INC., Cupertino, CA (US)

(72) Inventors: Sameer Pawar, Santa Clara, CA (US);
Huaning Niu, San Jose, CA (US);
Utsaw Kumar, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,897

(22) Filed: Jan. 9, 2020

(65) Prior Publication Data
US 2020/0287761 A1 Sep. 10, 2020

Related U.S. Application Data

(63) Continuation of application No. 15/747,009, filed as application No. PCT/US2016/023689 on Mar. 23, 2016, now Pat. No. 10,560,301.
(Continued)

(51) Int. Cl.
*H04L 27/26* (2006.01)
(52) U.S. Cl.
CPC ........ *H04L 27/265* (2013.01); *H04L 27/2607* (2013.01); *H04L 27/2613* (2013.01)
(58) Field of Classification Search
CPC .......................... H04L 27/265; H04L 27/2607; H04L 27/2613
See application file for complete search history.

(56) References Cited

U.S. PATENT DOCUMENTS 8,050,339 B2 * 11/2011 Wang ................ H04L 25/03159
375/260
2008/0267165 A1 * 10/2008 Bertrand ........... H04W 56/0045
370/350
(Continued)

FOREIGN PATENT DOCUMENTS

CN 101766008 A 6/2010
EP 2343849 A2 7/2011

OTHER PUBLICATIONS

Kumer et al. "A Waveform for 5G: Guard Interval DFT-s-OFDM," 2015 IEEE Globecom Workshops (GC Wkshps), San Diego, CA, 2015, pp. 1-6 (Year: 2015).*
(Continued)

*Primary Examiner* — Sam K Ahn
*Assistant Examiner* — Amneet Singh

(57) ABSTRACT

Disclosed are apparatuses for communication devices. An apparatus for a communication device includes control circuitry configured to determine a discrete Fourier transform (DFT) of a constant amplitude zero autocorrelation waveform (CAZAC) sequence appended with zeros in the time domain to generate a frequency domain interpolated CAZAC sequence. The control circuitry is also configured to determine an inverse discrete Fourier transform (IDFT) of the frequency domain interpolated CAZAC sequence to generate a demodulation reference signal (DMRS), and cause the DMRS to be transmitted through a cellular data network. An apparatus for a communication device includes control circuitry configured to perform a Fourier transform on a received DMRS to obtain a resulting signal, and use the resulting signal as a reference to demodulate orthogonal frequency-division multiplexing (OFDM) symbols. The control circuitry is also configured to perform a minimum
(Continued)

mean squares estimation (MMSE) channel estimation on the resulting signal.

15 Claims, 7 Drawing Sheets

Related U.S. Application Data

(60) Provisional application No. 62/242,952, filed on Oct. 16, 2015.

(56) References Cited

U.S. PATENT DOCUMENTS

| | | |
|---|---|---|
| 2009/0296585 A1 | 12/2009 | Melis et al. |
| 2011/0075760 A1 | 3/2011 | Ogawa et al. |
| 2012/0320848 A1 | 12/2012 | Chen et al. |
| 2014/0355626 A1 | 12/2014 | Fechtel |
| 2015/0295631 A1 | 10/2015 | Yoshimoto et al. |

OTHER PUBLICATIONS

U.S. Appl. No. 15/747,009, Non-Final Office Action, dated Mar. 6, 2019, 19 pages.

U.S. Appl. No. 15/747,009, Notice of Allowance, dated Sep. 27, 2019, 7 pages.

Berardinelli, Gilberto, et al., "Zero-tail DFT-spread-OFDM signals", IEEE Globecom Workshops, Dec. 9, 2013, pp. 229-234.

Hou, Xiaolin, et al., "DMRS Design and Channel Estimation for LTE-Advanced MIMO Uplink", Vehicular Technology Conference Fall, IEEE 70th, Sep. 20, 2009, pp. 1-5.

Huemer, Mario, et al., "Coded OFDM by Unique Word Prefix", Cornell University Library, 201 Olin Library Cornell University Ithaca, NY 14853, Jan. 8, 2010, 5 pages.

PCT/US2016/023689, International Search Report and Written Opinion, dated Aug. 9, 2016, 13 pages.

\* cited by examiner

APPARATUSES FOR DMRS DESIGN OR PROCESSING FOR GUARD INTERVAL OR ZERO TAIL DFT SPREAD OFDM SYSTEMS

RELATED APPLICATIONS

This application claims priority to U.S. Provisional Application 62/242,952, filed Oct. 16, 2015, the entire disclosure of which is hereby incorporated herein by this reference.

TECHNICAL FIELD

This disclosure relates generally to the field of wireless communications, and more specifically to user equipment and base stations configured to use demodulation reference signals (DMRS) for wireless communications.

BACKGROUND

In recent years, demand for access to fast mobile wireless data for mobile electronic devices has fueled the development of the 3rd Generation Partnership Project (3GPP) long term evolution (LTE) communication system (hereinafter "LTE system"). End users access the LTE system using mobile electronic devices (known as "user equipment," or equivalently "UE") including appropriate electronics and software modules to communicate according to standards set forth by 3GPP. Discussions and research are currently directed toward a next generation communication protocol (e.g., 5G).

DETAILED DESCRIPTION OF PREFERRED EMBODIMENTS

Figure 1:
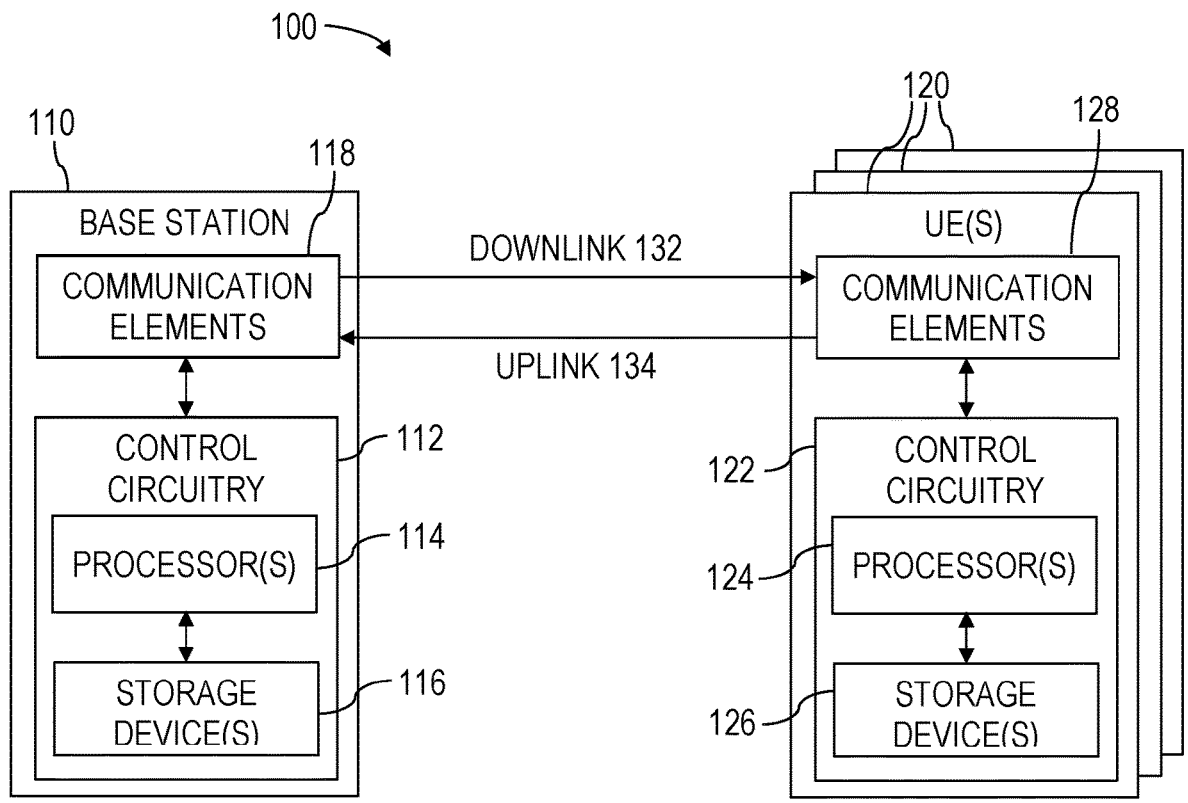
FIG. 1 is a simplified block diagram of a wireless communication system according to some embodiments.

In the following detailed description, reference is made to the accompanying drawings, which form a part hereof, and in which is shown by way of illustration specific embodiments in which the present disclosure may be practiced. These embodiments are described in sufficient detail to enable those of ordinary skill in the art to practice the disclosure made herein. It should be understood, however, that the detailed description and the specific examples, while indicating examples of embodiments of the disclosure, are given by way of illustration only, and not by way of limitation. From the disclosure, various substitutions, modifications, additions, rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the present disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, a signaling diagram, or a block diagram. Although a flowchart or a signaling diagram may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media includes both computer storage media (i.e., non-transitory media) and communication media including any medium that facilitates transfer of a computer program from one place to another.

In wireless communication systems, demodulation reference signals (DMRSs) are used for channel estimation so that data can be coherently demodulated and decoded. It is advantageous for DMRSs to have a constant modulus, a zero-auto correlation, and a low cross-correlation. DMRSs designed with these goals enable equal excitation and uniform channel estimation performance across subcarriers, while simultaneously reducing intra cell interference and inter cell interference.

In order to generate DMRSs having constant modulus, zero-auto correlation, and low cross-correlation, Long Term Evolution (LTE) systems use Zadoff-Chu (ZC) sequences to generate DMRSs for an LTE uplink (UL). A constant modulus pilot ZC sequence is used to provide equal excitation to all pilot tones (ZC sequences are constant amplitude zero-autocorrelation (CAZAC) sequences). Accordingly, uniform channel estimation performance is provided across all the subcarriers carrying the pilot signal. Also, a zero-auto correlation property of ZC sequences enables reliable channel estimation for multiple users. Different users in a same cell use the same base ZC sequence, but with a different cyclic shift for each user. As a result, pilot transmissions from different users in the same cell are orthogonal to each other. Furthermore, ZC sequences reduce inter-cell interference in channel estimation.

Guard interval (GI) discrete Fourier transform (DFT) spread OFDM (sometimes referred to herein simply as "GI-DFT-s-OFDM") and zero tail (ZT) DFT spread OFDM (sometimes referred to herein simply as "ZT-DFT-s-OFDM") waveforms have also been shown to introduce benefits in wireless communications. For example, GI-DFT-s-OFDM and ZT-DFT-s-OFDM waveforms have been shown to provide flexibility in adapting guard interval length, good adjacent channel leakage-power ratio (ACLR) performance, and additional capability for time/frequency synchronization, among other benefits.

Although using GI-DFT-s-OFDM and ZT-DFT-s-OFDM waveforms for wireless communication systems provides some advantages, it also introduces some challenges. For example, if GI-DFT-s-OFDM or ZT-DFT-s-OFDM waveforms were used in designing DMRSs in a wireless communication system (e.g., a mmWave cellular system, etc.), each OFDM symbol would have either a fixed GI sequence or zeros at its tail. The GI sequence or zeros at the tail would interrupt the ZC sequence, preventing constant modulus, zero-auto correlation, and low cross-correlation. Accordingly, using GI-DFT-s-OFDM or ZT-DFT-s-OFDM waveforms for designing DMRSs conflicts with constant modulus, zero-auto correlation, and low cross-correlation of DMRSs.

Embodiments disclosed herein relate to DMRS design for wireless communication systems (e.g., mmWave cellular systems) that combine the advantages of GI-DFT-s-OFDM and ZT-DFT-s-OFDM waveforms with the benefits resulting from using CAZAC sequences (e.g., ZC sequences). Such DMRS design is equally applicable to the uplink (UL) data channel and the downlink (DL) data channel. DMRSs according to embodiments disclosed herein are compatible with GI-DFT-s-OFDM and ZT-DFT-s-OFDM waveforms, while simultaneously providing good channel estimation performance (e.g., constant modulus, zero-auto correlation, and low cross-correlation). Although the following discussions focus on GI-DFT-s-OFDM waveform implementations, the principles discussed apply similarly to ZT-DFT-s-OFDM waveform implementations.

In some embodiments, disclosed is an apparatus for a communication device. The apparatus includes control circuitry configured to generate an appended constant amplitude zero-autocorrelation waveform (CAZAC) sequence including a CAZAC sequence with zeros appended thereto. The control circuitry is also configured to determine a discrete Fourier transform (DFT) of the appended CAZAC sequence to obtain a frequency domain interpolated CAZAC sequence. The control circuitry is further configured to determine an inverse discrete Fourier transform (IDFT) of the frequency domain interpolated CAZAC sequence to generate a demodulation reference signal (DMRS) for coherent demodulation of orthogonal frequency-division multiplexing (OFDM) symbols. The control circuitry is also configured to cause communication elements of the communication device to transmit the DMRS through a cellular data network to a far-end communication device.

In some embodiments, disclosed is an apparatus for a communication device. The apparatus includes control circuitry configured to process a demodulation reference signal (DMRS) received from a far-end communication device through one or more communication elements of the communication device, the DMRS generated from an appended constant amplitude zero-autocorrelation (CAZAC) sequence including zeros appended to a CAZAC sequence. The control circuitry is also configured to perform a Fourier transform on the received DMRS to obtain a resulting signal, and use the resulting signal as a reference to demodulate orthogonal frequency-division multiplexing (OFDM) symbols received from the far-end communication device. The control circuitry is further configured to perform a minimum mean squares estimation (MMSE) channel estimation on the resulting signal to estimate a communication channel between the communication device and the far-end communication device.

In some embodiments, disclosed is an apparatus for a user equipment (UE). The apparatus includes control circuitry configured to generate an appended Zadoff-Chu (ZC) sequence including a ZC sequence with zeros appended thereto, and spread the appended ZC sequence to obtain a frequency domain interpolated ZC sequence. The control circuitry is also configured to determine an inverse discrete Fourier transform (IDFT) of the frequency domain interpolated ZC sequence to generate a demodulation reference signal (DMRS) for coherent demodulation of orthogonal frequency-division multiplexing (OFDM) symbols transmitted by the UE to a cellular base station. The control circuitry is further configured to cause the DMRS to be transmitted through a cellular data network to the cellular base station.

FIG. 1 is a simplified block diagram of a wireless communication system 100 according to some embodiments. The wireless communication system 100 includes a base station 110 and User Equipment (UEs) 120. The base station 110 includes communication elements 118 (e.g., an antenna, transmission circuitry, receiving circuitry, etc.) configured to engage in wireless communication with communication elements 128 of the UEs 120 through a downlink 132 (i.e., communication from the base station 110 to one or more of the UEs 120) and an uplink 134 (i.e., communication from one or more of the UEs 120 to the base station 110).

Figure 2:
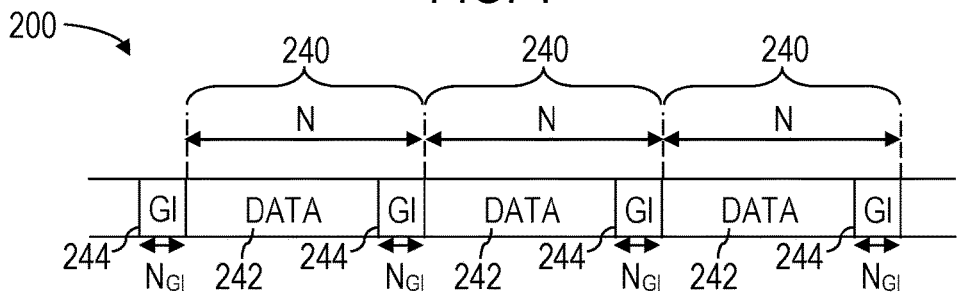
FIG. 2 is a simplified illustration of a GI-DFT-s-OFDM waveform according to some embodiments.
Figure 3:
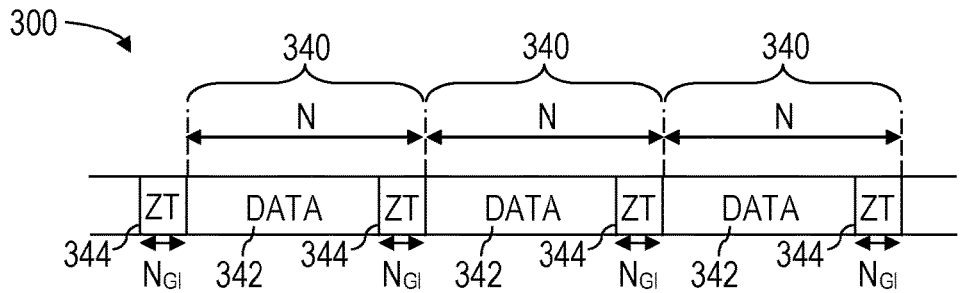
FIG. 3 is a simplified illustration of a ZT-DFT-s-OFDM waveform according to some embodiments.

The base station 110 and the UEs 120 include control circuitry 112, 122, respectively, configured to perform functions of embodiments described herein. By way of non-limiting example, at least one of the control circuitry 112, 122 is configured to generate a DMRS for coherent demodulation of orthogonal frequency-division multiplexing (OFDM) symbols (e.g., such as symbols 240, 340 transmitted in one or more of the OFDM waveforms 200, 300 of FIGS. 2 and 3) transmitted between the base station 110 and the UEs 120. Also by way of non-limiting example, at least one of the control circuitry 112, 122 is configured to process the DMRS for coherent demodulation of OFDM symbols (e.g., such as the symbols 240, 340 transmitted in one or more of the OFDM waveforms 200, 300 of FIGS. 2 and 3). FIGS. 2 and 3 illustrate example OFDM symbols 200, 300, respectively, according to embodiments of the disclosure.

FIG. 2 is a simplified illustration of a GI-DFT-s-OFDM waveform 200 according to some embodiments. The GI-DFT-s-OFDM waveform 200 includes symbols 240 of length N. Each of the symbols 240 includes a reference (data) signal component 242 and a guard interval 244. Each guard interval 244 includes a guard interval sequence of length $N_{GI}$. Each reference signal component 242 includes data symbols, and is of length $N-N_{GI}$. In some embodiments, the length $N_{GI}$ of the guard interval 244 may be chosen, based at least in part, on a determine delay spread of a channel between a communication device and a far-end communication device (e.g., between the base station 110 and the UE 120, or vice versa).

FIG. 3 is a simplified illustration of a ZT-DFT-s-OFDM waveform 300 according to some embodiments. The ZT-DFT-s-OFDM waveform 300 includes symbols 340 of length N. Each of the symbols 340 includes a reference signal component 342 and a zero tail 344. Each zero tail 344 includes a series of zeros of length $N_{GI}$ (the "GI" in the subscript is proper because a zero tail 344 is equivalent to a guard interval 344 corresponding to a guard interval sequence of zeros). Each reference signal component 342 includes data symbols, and is of length $N-N_{GI}$.

Referring again to FIG. 1, the control circuitry 118, 128 includes at least one or more processors 114, 124 (sometimes referred to herein as "processor" 114, 124) operably coupled to one or more data storage devices 116, 126 (sometimes referred to herein as "storage" 116, 126). The processor 114, 124 includes any of a central processing unit (CPU), a microcontroller, a programmable logic controller (PLC), a programmable device, other processing device, or combinations thereof. In some embodiments the processor 114, 124 also includes one or more hardware elements (not shown) configured to perform at least a portion of the functions the control circuitry 112, 122 is configured to perform. By way of non-limiting example, the processor 114, 124 may include an application specific integrated circuit, a system on chip (SOC), an array of logic gates, an array of programmable logic gates (e.g., a field programmable gate array (FPGA)), other hardware elements, or combinations thereof. The processor 114, 124 is configured to execute computer-readable instructions stored on the storage 116, 126.

The storage 116, 126 may include non-transitory computer-readable storage medium. By way of non-limiting example, the storage 116, 126 includes volatile storage (e.g., random access memory (RAM)), non-volatile storage (e.g., read only memory (ROM)), or combinations thereof. In some embodiments, the processor 114, 124 may be configured to transfer computer-readable instructions stored in non-volatile storage to volatile storage for execution. By way of non-limiting example, the storage 116, 126 may include dynamic RAM (DRAM), electrically programmable read-only memory (EPROM), a hard drive, a solid state drive, a Flash drive, a magnetic disc, removable media (e.g., memory cards, thumb drives, optical discs, etc.), or other storage devices.

The computer-readable instructions stored on the storage 116, 126 are configured to instruct the processor 114, 124 to perform at least a portion of the operations the control circuitry 112, 122 is configured to perform. By way of non-limiting example, the computer-readable instructions may be configured to instruct the processor 114, 124 to perform at least a portion of the functions a DMRS generator 400 (FIG. 4) is configured to perform. Also by way of non-limiting example, the computer-readable instructions may be configured to instruct the processor 114, 124 to perform at least a portion of the functions a DMRS processor 600 (FIG. 6) is configured to perform. Further description of examples of the control circuitry 112, 122 are provided below with reference to FIGS. 9 and 12.

Figure 4:
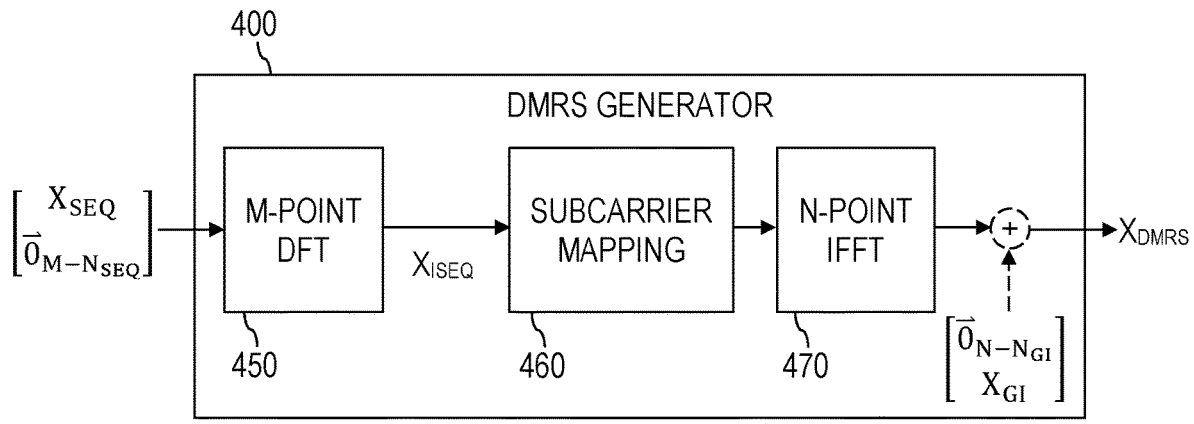
FIG. 4 is a simplified signal flow diagram of an example DMRS generator that can be implemented by one or more control circuitry of FIG. 1, according to some embodiments.

FIG. 4 is a simplified signal flow diagram of an example DMRS generator 400 that can be implemented by one or more of control circuitry 112, 122 of FIG. 1, according to some embodiments. The DMRS generator 400 is configured to generate DMRSs. The DMRS generator 400 includes an M-point discrete Fourier transform calculator 450 (sometimes referred to herein as "M-point DFT" 450), a subcarrier mapper 460, and an N-point inverse Fourier transform calculator 470 (sometimes referred to herein as "N-point IFFT" 470).

The M-point DFT 450 is configured to generate an interpolated frequency domain CAZAC sequence $X_{ISEQ}$ (e.g., an interpolated frequency domain ZC sequence) from an appended CAZAC sequence $X_{APP}$ (e.g., an appended ZC sequence) by determining a discrete Fourier transform (DFT) of the appended CAZAC sequence $X_{APP}$. By way of non-limiting example, the M-point DFT 450 may be configured to calculate a fast Fourier transform (FFT) of the appended CAZAC sequence $X_{APP}$. The interpolated frequency domain CAZAC sequence $X_{ISEQ}$ may be used as a reference for demodulating OFDM symbols (e.g., the OFDM symbols 240, 340 of FIGS. 2 and 3).

In some embodiments, the appended CAZAC sequence $X_{APP}$ includes a CAZAC sequence $X_{SEQ}$ (e.g., a ZC sequence) having zeros $\vec{0}_{M-N_{SEQ}}$ appended thereto. Accordingly, in such embodiments, the CAZAC sequence $X_{ISEQ}$ may be given by:

$$X_{APP} = \begin{bmatrix} X_{SEQ} \\ \vec{0}_{M-N_{SEQ}} \end{bmatrix},$$

where M is a length of $X_{APP}$, $N_{SEQ}$ is a length of $X_{SEQ}$, and a length of $\vec{0}_{M-N_{SEQ}}$ is given by $M-N_{SEQ}$.

In some embodiments, the CAZAC sequence $X_{SEQ}$ is a ZC sequence. Since a Fourier transform of a ZC sequence is another ZC sequence, the resulting interpolated frequency domain CAZAC sequence $X_{ISEQ}$ includes an interpolated frequency domain Zadoff Chu sequence (i.e., an interpolated version of the ZC sequence that would result from taking a DFT of the ZC sequence of $X_{SEQ}$). A carefully designed interpolated ZC sequence in the frequency domain (e.g., the CAZAC sequence $X_{ISEQ}$) can have an almost zero tail in the time domain. Also, while the interpolated ZC sequence may not directly have all the desired properties of a good pilot signal for channel estimation (e.g., constant modulus, zero-autocorrelation, and low cross correlation), the interpolated ZC sequence is generated from a ZC sequence which has those properties. A far-end communication device can exploit the underlying properties of the ZC sequence from its interpolated version to achieve relatively good channel estimation performance (e.g., using an MMSE channel estimator 690 of FIG. 6).

The subcarrier mapper 460 is configured to map the interpolated frequency domain CAZAC sequence $X_{ISEQ}$ to subcarriers. The pilot signal loaded on the subcarriers is not a constant-modulus signal, but rather an interpolated M-length sequence of a CAZAC sequence (e.g., a ZC sequence).

The N-point IFFT calculator 470 is configured to determine an inverse discrete Fourier transform (IDFT) of the frequency domain interpolated CAZAC sequence $X_{ISEQ}$ to generate a DMRS $X_{DMRS}$ for coherent demodulation of OFDM symbols 200, 300 (FIGS. 2 and 3, respectively). A total number of samples in an OFDM symbol 200, 300 (FIGS. 2 and 3, respectively) is N, and $N_{GI}$ is a length of a guard interval sequence 244, 344 (FIGS. 2 and 3, respectively) within each OFDM symbol 200, 300.

In some embodiments, the length $N_{SEQ}$ of the CAZAC sequence $X_{SEQ}$ used in the appended CAZAC sequence $X_{APP}$ is determined by selecting a largest prime number such that:

$$\frac{N \times N_{SEQ}}{M} \leq N - N_{GI},$$

where M is the length of the appended CAZAC sequence $X_{APP}$, N is the length of an OFDM symbol 240, 340 (FIGS. 2 and 3, respectively), and $N_{GI}$ is the length of the guard interval sequence 244, 344 (FIGS. 2 and 3, respectively) within each OFDM symbol 200, 300 (FIGS. 2 and 3, respectively).

Referring to FIGS. 1 and 4 together, at least one of the control circuitry 112, 122 may be configured to cause the communication elements 118, 128 corresponding thereto to transmit the DMRS $X_{DMRS}$ through a cellular data network to the other of the control circuitry 112, 122. By way of non-limiting example, if the DMRS $X_{DMRS}$ is used to demodulate OFDM symbols 240, 340 (FIGS. 2 and 3, respectively) of the uplink 134, the control circuitry 122 of the UE 120 is configured to generate the DMRS $X_{DMRS}$ and transmit the DMRS $X_{DMRS}$ to the base station 110 using the communication elements 128. Also by way of non-limiting example, if the DMRS $X_{DMRS}$ is used to demodulate OFDM symbols 240, 340 of the downlink 132, the control circuitry 112 of the base station 110 is configured to generate the DMRS $X_{DMRS}$ and transmit the DMRS $X_{DMRS}$ to the UE 120.

As zeros $\vec{0}_{M-N_{SEQ}}$ are appended to the CAZAC sequence $X_{SEQ}$ to form the appended CAZAC sequence $X_{APP}$, the DMRS $X_{DMRS}$ output from the N-point IFFT calculator 470 will generally be at least approximately a zero-tail DMRS $X_{DMRS}$. Accordingly, in embodiments where ZT-DFT-s-OFDM is used, the DMRS $X_{DMRS}$ is transmitted as is. In embodiments, however, where GI-DFT-s-OFDM is used, the DMRS generator 400 may be configured to add a guard interval sequence $X_{GI}$ to the DMRS $X_{DMRS}$ before transmitting the DMRS $X_{DMRS}$. By way of non-limiting example, the DMRS generator 400 may be configured to add a vector of zeros $\vec{0}_{N-N_{GI}}$ of length $N-N_{GI}$ having a guard interval sequence $X_{GI}$ appended thereto, or equivalently:

$$\begin{bmatrix} \vec{0}_{N-N_{GI}} \\ X_{GI} \end{bmatrix},$$

where $N_{GI}$ is the length of the guard interval. The resulting DMRS $X_{DMRS}$ transmitted includes the guard interval sequence $X_{GI}$ appended thereto instead of the zero tail.

Figure 5:
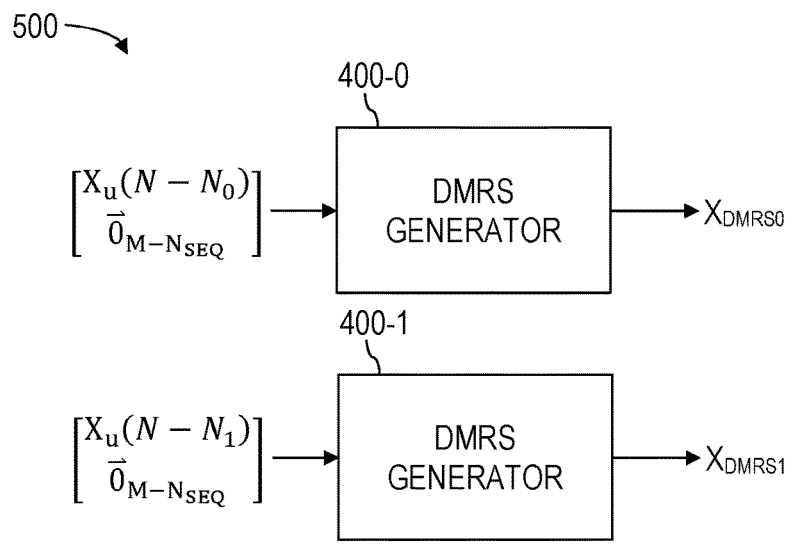
FIG. 5 is a simplified signal flow diagram illustrating shifted base sequences of the CAZAC sequence for DMRS generation.

FIG. 5 is a simplified signal flow diagram 500 illustrating shifted base sequences of the CAZAC sequence for DMRS generation. In some embodiments, UEs 120 (FIG. 1) within a same cell of a cellular base station 110 (FIG. 1) include the DMRS generator 400 (FIG. 4) implemented by the control circuitry 122 (FIG. 1) thereof. For example, a first UE 120 may implement a first DMRS generator 400-0, and a second UE 120 may implement a second DMRS generator 400-1. The DMRS generators 400-1, 400-2 may be similar to the DMRS generator 400 discussed with reference to FIG. 4.

In the example of FIG. 5, a cyclically shifted ZC base sequence is used to distinguish between the first UE 120 and the second UE 120. For example, in FIG. 5, the first DMRS generator 400-0 uses a base ZC sequence with root "u" along with a cyclic shift of No, while the second DMRS generator 400-1 uses a base ZC sequence with root "u" along with a cyclic shift of $N_1$. A similar approach may be used to train multiple antennas in a single user multiple input, multiple output (MIMO) scenario. Also, UEs 120 in adjacent cells of other base stations can use base ZC sequence with a different root index.

Figure 6:
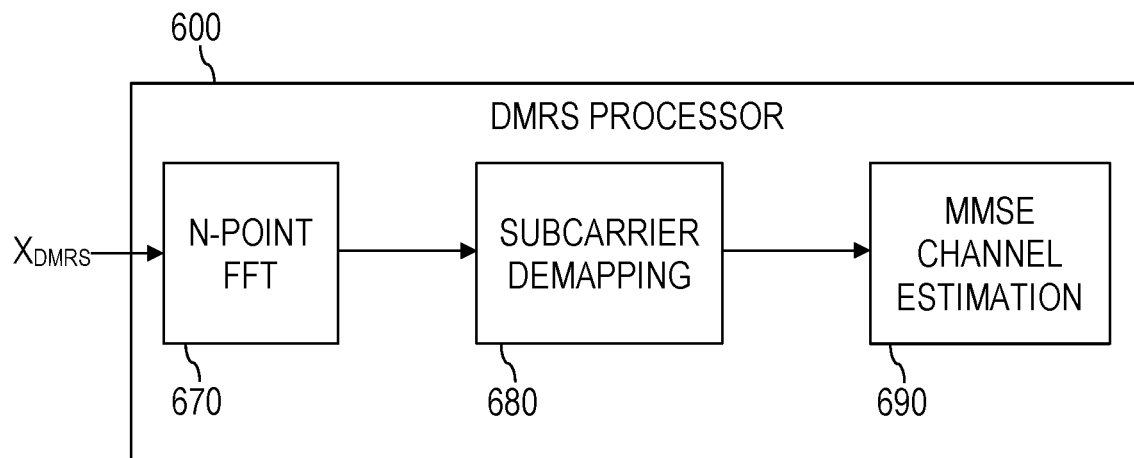
FIG. 6 is a simplified signal flow diagram of an example DMRS processor that can be implemented by one or more of control circuitry of FIG. 1, according to some embodiments.

FIG. 6 is a simplified signal flow diagram of an example DMRS processor 600 that can be implemented by one or more of control circuitry 112, 122 of FIG. 1, according to some embodiments. The DMRS processor 600 includes an N-point Fourier transform generator 670 (sometimes referred to herein as "N-point FFT" 670) and a subcarrier mapper 680. The N-point FFT 670 is configured to compute a Fourier transform of a received DMRS $X_{DMRS}$. The subcarrier demapper 680 is configured to demap subcarriers using a resulting signal resulting from computing the Fourier transform of the received DMRS $X_{DMRS}$.

The DMRS processor 600 also includes an MMSE channel estimator 690. An interpolated M length ZC sequence (from a base sequence of length $N_{SEQ}$<M) has an unequal power/excitation on different subcarriers. This results in different signal to noise ratios across subcarriers. An appropriately designed MMSE estimator 690 compensates for this using a non-equal weight filter to process the received signal. The tail GI sequence in the DMRS symbol causes unwanted interference to the pilot carrying subcarriers. In embodiments where GI-DFT-s-OFDM is used, the interference resulting from the GI sequence is removed after channel equalization. An iterative channel estimation algorithm that removes GI interference using previous channel estimates converges relatively quickly to provide an overall satisfactory channel estimation performance. Accordingly, the MMSE channel estimator 690 includes a non-equal weight filter to process the received signal, and remove the interference resulting from the GI sequence in embodiments where GI-DFT-s-OFDM is used. In embodiments where ZT-DFT-s-OFDM is used, the MMSE channel estimator 690 may not include a non-equal weight filter to process the received signal even in the frequency domain, because interference does not generally result from a zero-tail DMRS.

A time-domain MMSE channel estimator 690 (FIG. 6) can be equally used with the GI-DFT-s-OFDM waveform 200 (FIG. 2) DMRS symbol $X_{DMRS}$ of FIG. 4. In the case of time domain estimation one the GI sequence can be used as a part of the pilot signal, and hence use a non-iterative algorithm.

Figure 7:
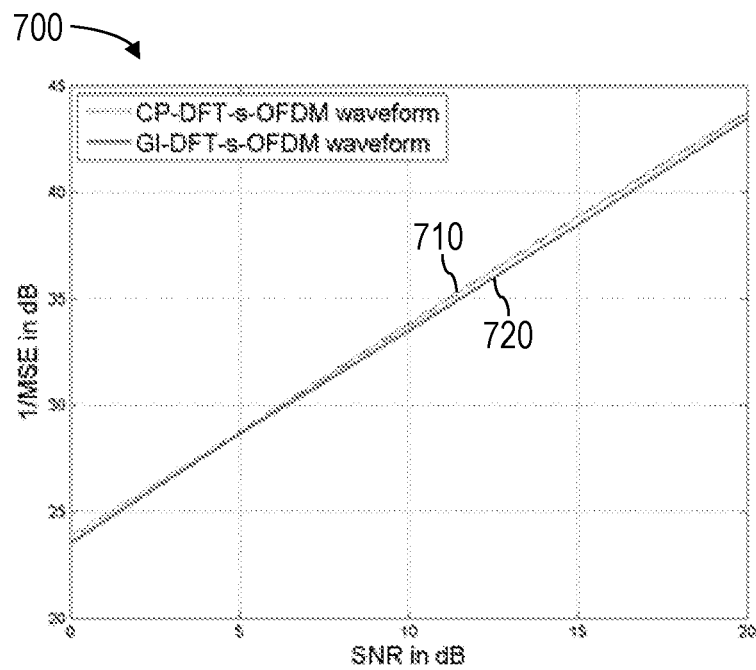
FIG. 7 is a simplified plot illustrating an inverse of simulated mean squared error of channel estimation for a GI-DFT-s-OFDM waveform implementation plotted against signal to noise ratio.

FIG. 7 is a simplified plot 700 illustrating an inverse of simulated mean-squared error 720 (sometimes referred to herein as "1/MSE 720) of channel estimation for a GI-DFT-s-OFDM waveform implementation plotted against signal to noise ratio. Simulations of an iterative MMSE channel estimation algorithm operated on the described GI-DFT-s-OFDM waveform DMRS symbol were performed. Another MMSE channel estimation algorithm used in conjunction with a cyclic prefix DFT-s-OFDM (CP-DFT-s-OFDM) waveform DMRS was simulated, for comparison with the simulated GI-DFT-s-OFDM simulation. The following system parameters were used for the simulation:

FFT size=1024.

Number of used subcarriers=600.

Channel: A simple 3-tap delay Gaussian channel with delay spread equivalent to 2% of OFDM symbol duration.

Cyclic prefix or guard interval sequence size=73, which is 7% of the total OFDM samples.

Metric used is mean-squared error (MSE) (dB)=20 log 10(norm(h−h^)).

As seen in the plot 700 of FIG. 7, 1/MSE 720 of a GI-DFT-s-OFDM implementation according to embodiments of the disclosure and 1/MSE 710 of a CP-DFT-s-OFDM implementation are very similar across a broad range of signal to noise ratios. Accordingly, although GI-DFT-s-OFDM introduces interference and the corresponding DMRS is not constant modulus, zero-autocorrelation, low cross-correlation, an appropriately designed MMSE channel estimator 690 (FIG. 6) can enable similar performance as CP-DFT-s-OFDM implementations under similar conditions. As a result, embodiments disclosed herein enable using GI-DFT-s-OFDM and ZT-DFT-s-OFDM while still achieving similar performance to systems that take advantage of constant modulus, zero-autocorrelation, and low cross correlation resulting from generating DMRSs using un-appended CAZAC sequences.

Figure 8:
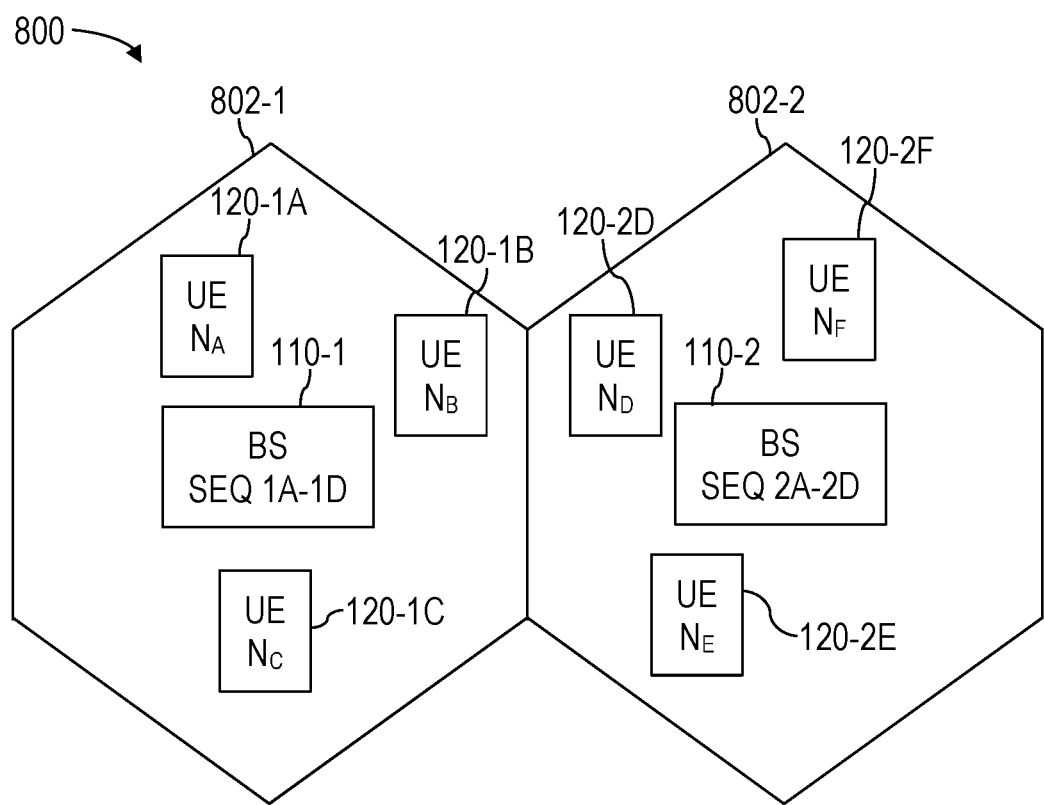
FIG. 8 is a simplified diagram of a cellular communication system, according to some embodiments.

FIG. 8 is a simplified diagram of a cellular communication system 800, according to some embodiments. The cellular communication system 800 includes multiple cells 802-1, 802-2, . . . (sometimes referred to herein simply together as "cells" 802, and individually as "cell" 802). Each cell 802 includes a base station 110-1, 110-2, . . . (sometimes referred to herein simply together as "base stations" 110 and individually as "base station" 110). Each cell 802 also includes UEs 120-1A, 120-1B, 120-1C, . . . , 120-2D, 120-2E, 120-2F, . . . (sometimes referred to herein simply together as "UEs" 120, and individually as "UE" 120). The base stations 110 and the UEs 120 are similar to the base station 110 and the UEs 120 discussed with reference to FIG. 1. In other words, at least one of the base stations 110 and the UEs 120 are configured to generate DMRSs $X_{DMRS}$ as discussed with reference to FIG. 4. Also, at least one of the base stations 110 and the UEs 120 are configured to process the DMRSs $X_{DMRS}$ as discussed with reference to FIG. 6.

In some embodiments, the base station 110-1 of a first cell 802-1 is configured to process DMRSs $X_{DMRS}$ generated using a first set of CAZAC base sequences SEQ 1A-1D (e.g., each having different DMRS lengths) (e.g., ZC sequences) assigned thereto. The first set of CAZAC base sequences SEQ 1A-1D are different from a second set of CAZAC base sequences assigned to the base station 110-2 in an adjacent second cell 802-2. Also, the first set of CAZAC base sequences are different from CAZAC base sequences assigned to any other adjacent cell 802. The base station 110-1 is configured to select and assign one of the CAZAC base sequences SEQ 1A-1D assigned thereto to the UEs 120-1A, 120-1B, 120-1C, . . . in the first cell 802-1 for use by the UEs 120-1A, 120-1B, 120-1C, . . . to generate DMRSs $X_{DMRS}$. The base station 110-1 is also configured to assign a different cyclic offset $N_A$, $N_B$, $N_C$, . . . to each of the UEs 120-1A, 120-1B, 120-1C in the first cell 802-1. Each of the UEs 120-1A, 120-1B, 120-1C in the first cell 802-1 are configured to generate DMRSs $X_{DMRS}$ using the assigned CAZAC base sequence and cyclic offset $N_A$, $N_B$, $N_C$, . . . .

Other cells 802 adjacent to the first cell 802-1 may function similarly as described with reference to the first cell 802-1. For example, the base station 110-2 of the second cell 802-2 has a second set of CAZAC base sequences SEQ 2A-2D assigned thereto, and is configured to assign one of the CAZAC base sequences SEQ 2A-2D and a different cyclic offset $N_D$, $N_E$, $N_F$, . . . to each UE 120-2D, 120-2E, 120-2F, . . . . Each of the UEs 120-2D, 120-2E, 120-2F, . . . is configured to generate DMRSs $X_{DMRS}$ using the assigned CAZAC base sequence and the cyclic offset $N_D$, $N_E$, $N_F$, . . . assigned thereto.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 9:
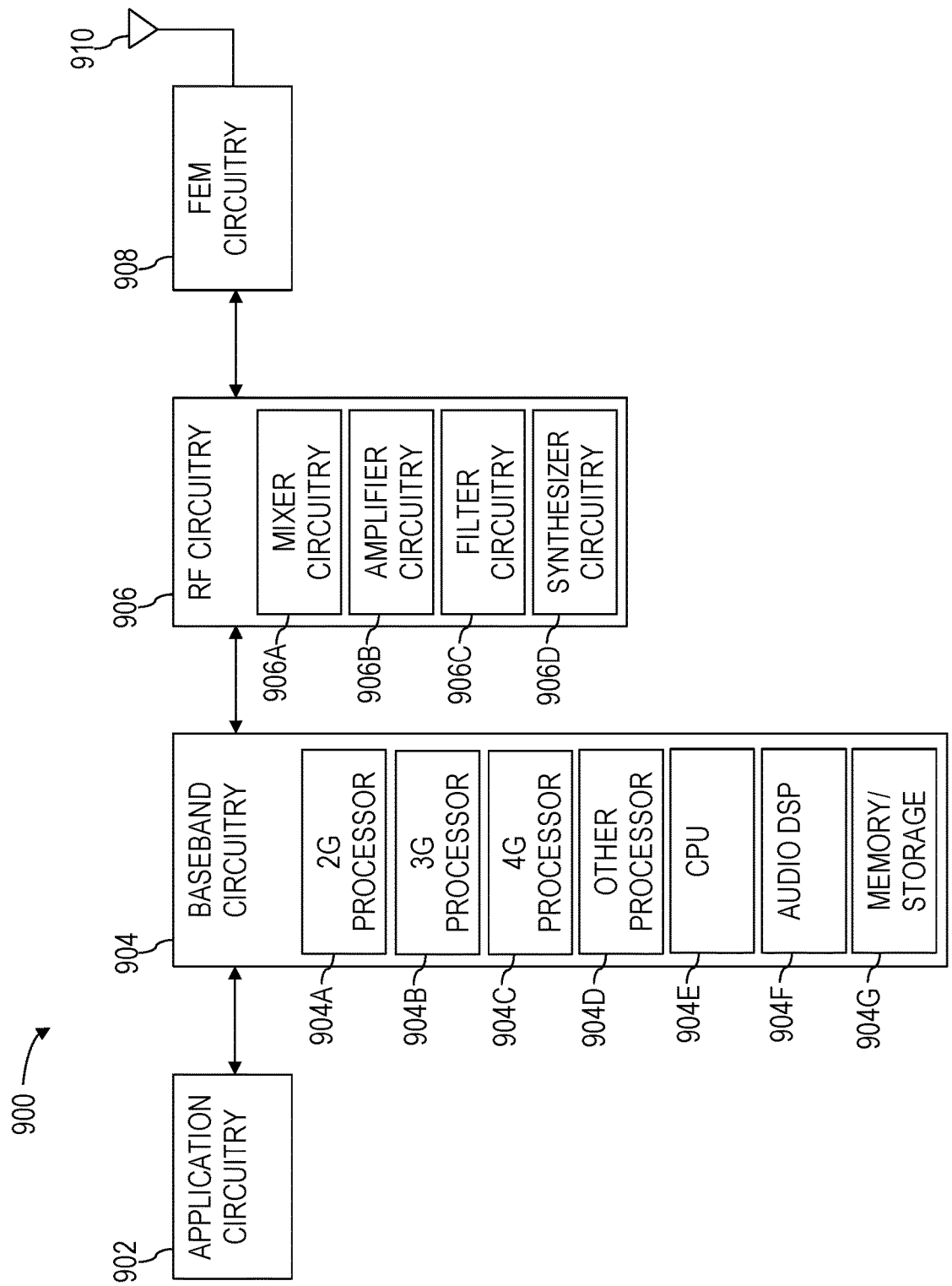
FIG. 9 illustrates, for one embodiment, example components of an electronic device.

Embodiments described herein may be implemented into a system using any suitably configured hardware and/or software. FIG. 9 illustrates, for one embodiment, example components of an electronic device 900. In embodiments, the electronic device 900 may be, implement, be incorporated into, or otherwise be a part of a user equipment (UE) (e.g., the UEs 120 of FIGS. 1 and 8), an evolved NodeB (eNB) (e.g., the eNBs 110 of FIGS. 1 and 8), or another device capable of operating in a mmWave cellular system. In some embodiments, the electronic device 900 may include application circuitry 902, baseband circuitry 904, Radio Frequency (RF) circuitry 906, front-end module (FEM) circuitry 908, and one or more antennas 910, coupled together at least as shown.

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband circuitry 904 may interface with the application circuitry 902 for generation and processing of the baseband signals and for controlling operations of the RF circuitry 906. For example, in some embodiments, the baseband circuitry 904 may include a second generation (2G) baseband processor 904A, third generation (3G) baseband processor 904B, fourth generation (4G) baseband processor 904C, and/or other baseband processor(s) 904D for other existing generations, generations in development, or generations to be developed in the future (e.g., fifth generation (5G), 6G, etc.). The baseband circuitry 904 (e.g., one or more of baseband processors 904A-D) may handle various radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 904 may include fast Fourier transform (FFT), precoding, and/or constellation mapping/demapping functionality. In some embodiments, encoding/decoding circuitry of the baseband circuitry 904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 904E of the baseband circuitry 904 may be configured to run elements of the protocol stack for signaling of the PHY, MAC, RLC, PDCP, and/or RRC layers. In some embodiments, the baseband circuitry may include one or more audio digital signal processor(s) (DSP) 904F. The audio DSP(s) 904F may include elements for compression/decompression and echo cancellation and may include other suitable processing elements in other embodiments.

The baseband circuitry 904 may further include memory/storage 904G. The memory/storage 904G may be used to load and store data and/or instructions for operations performed by the processors of the baseband circuitry 904. Memory/storage for one embodiment may include any combination of suitable volatile memory and/or non-volatile memory. The memory/storage 904G may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 904G may be shared among the various processors or dedicated to particular processors.

Components of the baseband circuitry may be suitably combined in a single chip or a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) and/or other wireless metropolitan area networks (WMAN), a wireless local area network (WLAN), and/or a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the RF circuitry 906 may include a receive signal path and a transmit signal path. The receive signal path of the RF circuitry 906 may include mixer circuitry 906A, amplifier circuitry 906B, and filter circuitry 906C. The transmit signal path of the RF circuitry 906 may include filter circuitry 906C and mixer circuitry 906A. RF circuitry 906 may also include synthesizer circuitry 906D for synthesizing a frequency for use by the mixer circuitry 906A of the receive signal path and the transmit signal path. In some embodiments, the mixer circuitry 906A of the receive signal path may be configured to down-convert RF signals received from the FEM circuitry 908 based on the synthesized frequency provided by synthesizer circuitry 906D. The amplifier circuitry 906B may be configured to amplify the down-converted signals and the filter circuitry 906C may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906A of the receive signal path may comprise passive mixers, although the scope of the embodiments is not limited in this respect.

In some embodiments, the mixer circuitry 906A of the transmit signal path may be configured to up-convert input baseband signals based on the synthesized frequency provided by the synthesizer circuitry 906D to generate RF output signals for the FEM circuitry 908. The baseband signals may be provided by the baseband circuitry 904 and may be filtered by filter circuitry 906C. The filter circuitry 906C may include a low-pass filter (LPF), although the scope of the embodiments is not limited in this respect.

In some embodiments, the mixer circuitry 906A of the receive signal path and the mixer circuitry 906A of the transmit signal path may include two or more mixers and may be arranged for quadrature downconversion and/or upconversion respectively. In some embodiments, the mixer circuitry 906A of the receive signal path and the mixer circuitry 906A of the transmit signal path may include two or more mixers and may be arranged for image rejection (e.g., Hartley image rejection). In some embodiments, the mixer circuitry 906A of the receive signal path and the mixer circuitry 906A of the transmit signal path may be arranged for direct downconversion and/or direct upconversion, respectively. In some embodiments, the mixer circuitry 906A of the receive signal path and the mixer circuitry 906A of the transmit signal path may be configured for superheterodyne operation.

In some embodiments, the output baseband signals and the input baseband signals may be analog baseband signals, although the scope of the embodiments is not limited in this respect. In some embodiments, the output baseband signals and the input baseband signals may be digital baseband signals. In these embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906D may be a fractional-N synthesizer or a fractional N/N+1 synthesizer, although the scope of the embodiments is not limited in this respect as other types of frequency synthesizers may be suitable. For example, synthesizer circuitry 906D may be a delta-sigma synthesizer, a frequency multiplier, or a synthesizer comprising a phase-locked loop with a frequency divider.

The synthesizer circuitry 906D may be configured to synthesize an output frequency for use by the mixer circuitry 906A of the RF circuitry 906 based on a frequency input and a divider control input. In some embodiments, the synthesizer circuitry 906D may be a fractional N/N+1 synthesizer.

In some embodiments, frequency input may be provided by a voltage controlled oscillator (VCO), although that is not a requirement. Divider control input may be provided by either the baseband circuitry 904 or the applications circuitry 902 depending on the desired output frequency. In some embodiments, a divider control input (e.g., N) may be determined from a look-up table based on a channel indicated by the applications processor 902.

Synthesizer circuitry 906D of the RF circuitry 906 may include a divider, a delay-locked loop (DLL), a multiplexer, and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements; a phase detector; a charge pump; and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals, and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910.

In some embodiments, the FEM circuitry 908 may include a TX/RX switch to switch between transmit mode and receive mode operation. The FEM circuitry 908 may include a receive signal path and a transmit signal path. The receive signal path of the FEM circuitry 908 may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906) and one or more filters to generate RF signals for subsequent transmission (e.g., by one or more of the one or more antennas 910).

In some embodiments, the electronic device 900 may include additional elements such as, for example, memory/storage, display, camera, sensor, and/or input/output (I/O) interface.

In some embodiments, the baseband circuitry 904 and/or the RF circuitry 906 or one or more other of the above described circuitry of the electronic device 900 may comprise a DFT-spreader which receives a demodulation reference symbol (DMRS) for coherent demodulation of GI-DFT-s-OFDM or ZT-DFT-s-OFDM symbols, which reference symbol comprises a sequence, generated in time-domain and appended with zeros to form input to the DFT-spreader as part of reference signal generation, which sequence maybe a Zadoff-Chu (ZC) sequence.

In some embodiments, the baseband circuitry 904 and/or the RF circuitry 906 or one or more of the above described circuitry of the electronic device 900 may comprise an inverse discrete Fourier transform (IDFT) processor to form a time-domain signal.

In some embodiments, the baseband circuitry 904 and/or the RF circuitry 906 or one or more of the above described circuitry of the electronic device 900 may comprise a minimum mean square error (MMSE) estimator using a non-equal weight filter to process a received signal in the frequency domain.

In some embodiments, the electronic device of FIG. 9 may be configured to perform one or more processes, techniques, and/or methods as described herein, or portions thereof. Examples of such processes are depicted in FIGS. 10 and 11.

Figure 10:
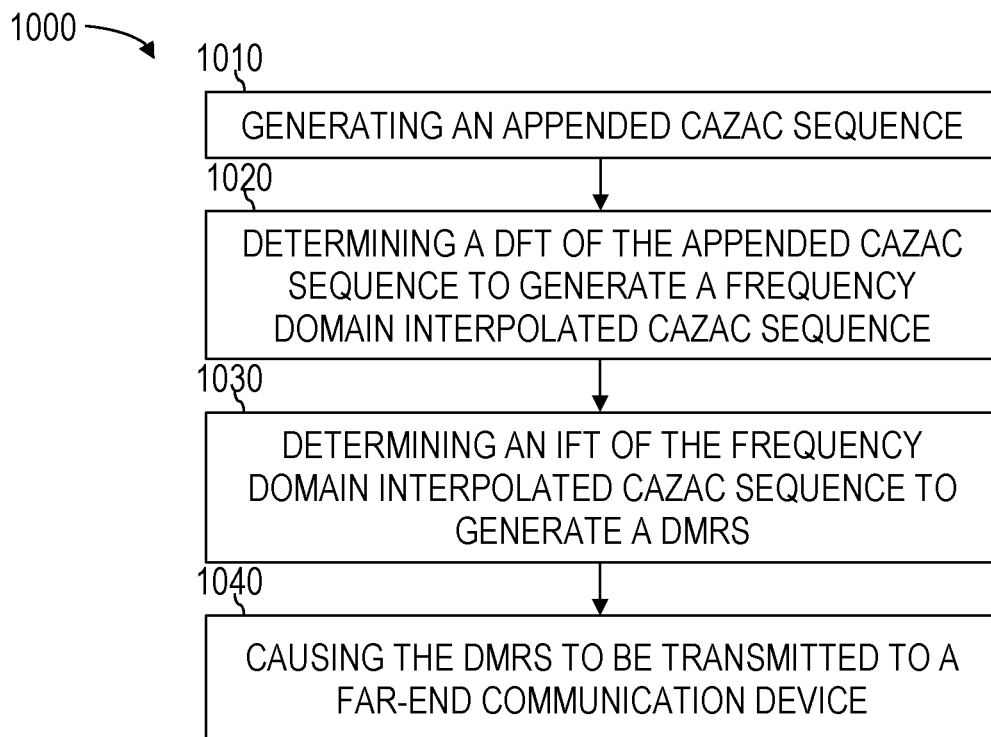
FIG. 10 is a simplified flowchart illustrating a method of generating a DMRS according to some embodiments.
Figure 11:
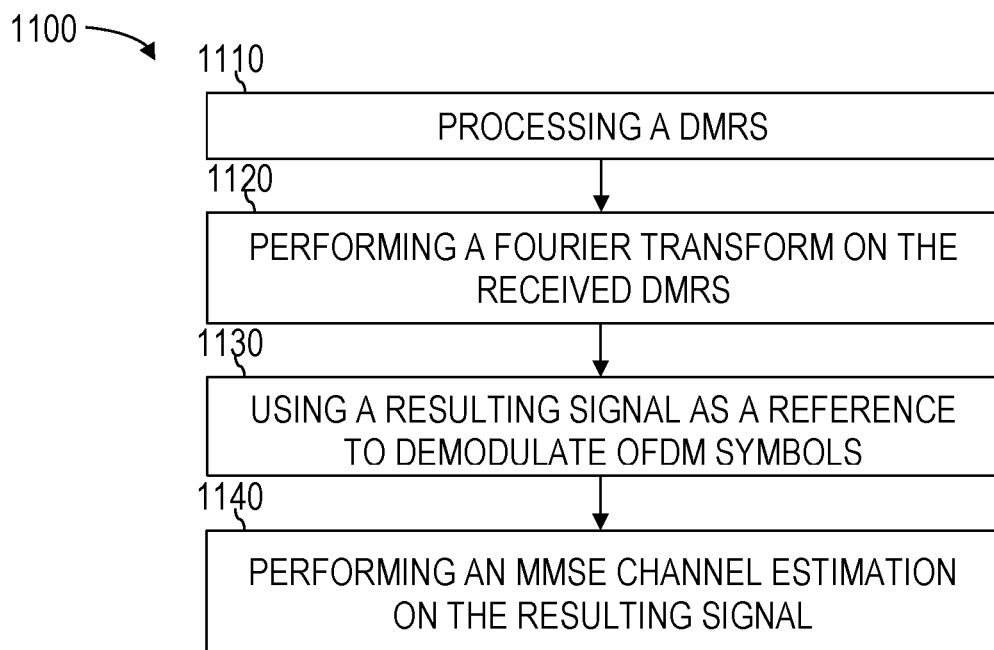
FIG. 11 is a simplified flowchart illustrating a method of processing a DMRS according to some embodiments.

FIG. 10 is a simplified flowchart illustrating a method 1000 of generating a DMRS according to some embodiments. The method 1000 includes generating 1010 an appended CAZAC sequence including a CAZAC sequence with zeros appended thereto. In some embodiments, the CAZAC sequence includes a ZC sequence.

The method 1000 also includes determining 1020 a discrete Fourier transform (DFT) of the appended CAZAC sequence to obtain a frequency domain interpolated CAZAC sequence. In some embodiments, the method 1000 also includes mapping the frequency domain interpolated CAZAC sequence into a plurality of subcarriers. In some embodiments, the length of the CAZAC sequence is determined to be a largest prime number such that:

$$\frac{N \times N_{SEQ}}{M} \leq N - N_{GI},$$

where M is the length of the appended CAZAC sequence $X_{APP}$, N is the length of an OFDM symbol 240, 340 (FIGS. 2 and 3, respectively), and $N_{GI}$ is the length of the guard interval sequence 244, 344 (FIGS. 2 and 3, respectively) within each OFDM symbol 200, 300 (FIGS. 2 and 3, respectively).

The method 1000 further includes determining 1030 an inverse discrete Fourier transform of the frequency domain interpolated CAZAC sequence to generate a DMRS for coherent demodulation of orthogonal frequency-division multiplexing (OFDM) symbols. In some embodiments, the method 1000 also includes determining a length of a guard interval of the OFDM symbols based, at least in part, on an expected delay spread of a communication channel between the communication device and the far-end communication device. In some embodiments, the method 1000 includes dynamically modifying the length of the guard interval as an expected delay spread of the communication channel changes.

The method 1000 also includes causing 1040 communication elements to transmit the DMRS through a cellular data network to a far-end communication device. In some embodiments, causing 1040 the communication elements to transmit the DMRS through a cellular data network comprises adding a guard interval (GI) sequence to the DMRS before causing the communications elements to transmit the DMRS through the cellular data network.

FIG. 11 is a simplified flowchart illustrating a method 1100 of processing a DMRS according to some embodiments. The method 1100 includes processing 1110 a DMRS from a far-end communication device through one or more communication elements of the communication device.

The method 1100 also includes performing 1120 a Fourier transform on the received DMRS to obtain a resulting signal. In some embodiments, the resulting signal includes a frequency domain interpolated CAZAC sequence. In some embodiments, the frequency domain interpolated CAZAC sequence includes a frequency domain interpolated ZC sequence.

The method 1100 further includes using 1130 the resulting signal as a reference to demodulate OFDM symbols received from the far-end communication device. In some embodiments, the method 1100 also includes demapping subcarriers of the resulting signal.

The method 1100 also includes performing 1140 an MMSE channel estimation on the resulting signal to estimate a communication channel. In some embodiments, performing 1140 an MMSE channel estimation includes using a non-equal weight filter to process the OFDM symbols. In some embodiments, performing 1140 an MMSE channel estimation on the resulting signal includes removing guard interval (GI) interference resulting from GIs of the OFDM signals after channel equalization. In some embodiments, removing GI interference comprises using an iterative channel estimation algorithm using previously determined channel estimates.

Figure 12:
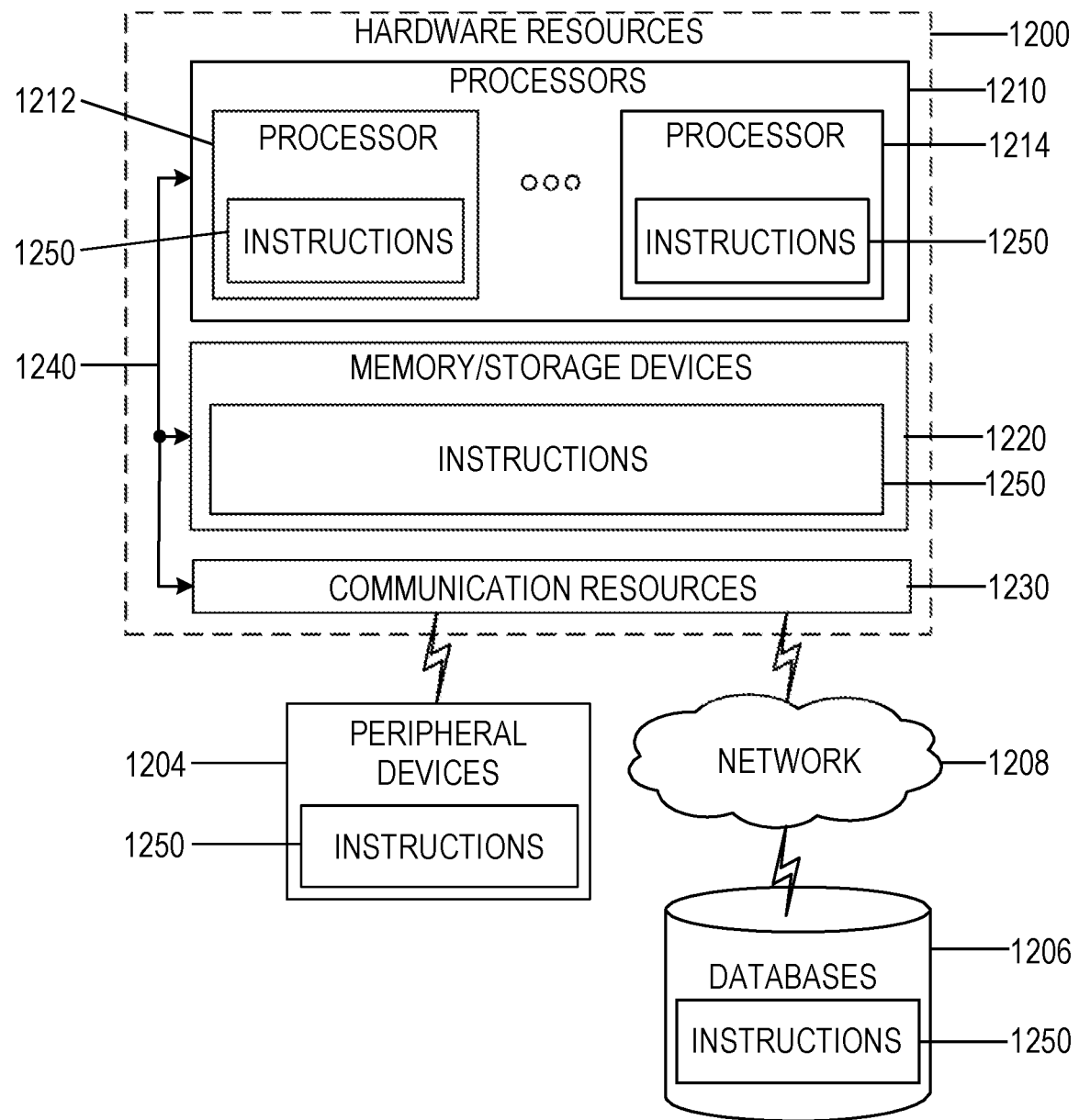
FIG. 12 is a block diagram illustrating components, according to some example embodiments.

FIG. 12 is a block diagram illustrating components, according to some example embodiments, able to read instructions from a machine-readable or computer-readable medium (e.g., a machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which are communicatively coupled via a bus 1240.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214. The memory/storage devices 1220 may include main memory, disk storage, or any suitable combination thereof.

The communication resources 1230 may include interconnection and/or network interface components or other suitable devices to communicate with one or more peripheral devices 1204 and/or one or more databases 1206 via a network 1208. For example, the communication resources 1230 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 and/or the databases 1206. Accordingly, the memory of processors 1210, the memory/storage devices 1220, the peripheral devices 1204, and the databases 1206 are examples of computer-readable and machine-readable media.

For example, the process and apparatuses to implement embodiments disclosed herein may include the following examples:

EXAMPLES

Example 1: An apparatus for a communication device, including: control circuitry configured to: generate an appended constant amplitude zero-autocorrelation waveform (CAZAC) sequence including a CAZAC sequence with zeros appended thereto; determine a discrete Fourier transform (DFT) of the appended CAZAC sequence to obtain a frequency domain interpolated CAZAC sequence; determine an inverse discrete Fourier transform (IDFT) of the frequency domain interpolated CAZAC sequence to generate a demodulation reference signal (DMRS) for coherent demodulation of orthogonal frequency division multiplexing (OFDM) symbols; and cause communication elements of the communication device to transmit the DMRS through a cellular data network to a far-end communication device.

Example 2: The apparatus of Example 1, wherein the control circuitry is configured to add a guard interval (GI)

sequence to the DMRS before causing the communication elements to transmit the DMRS through the cellular data network.

Example 3: The apparatus according to any one of Examples 1 and 2, wherein the control circuitry is also configured to map the frequency domain interpolated CAZAC sequence into a plurality of subcarriers.

Example 4: The apparatus according to any one of Examples 1-3, wherein the CAZAC sequence is a Zadoff Chu sequence.

Example 5: The apparatus according to any one of Examples 1-4, wherein the control circuitry is configured to determine a length of a guard interval of the OFDM symbols based, at least in part, on an expected delay spread of a communication channel between the one or more communication elements and the far-end communication device.

Example 6: The apparatus of Example 5, wherein the control circuitry is configured to determine a length of the CAZAC sequence to be a largest prime number such that:

$$\frac{N \times N_{SEQ}}{M} \le N - N_{GI},$$

where N is a number of samples in each of the OFDM symbols, M is a length of the appended CAZAC sequence, and NGI is a determined length of the guard interval of the OFDM symbols.

Example 7: The apparatus according to any one of Examples 5 and 6, wherein the control circuitry is configured to dynamically modify the length of the guard interval as the expected delay spread of a the communication channel changes.

Example 8: The apparatus according to any one of Examples 1-7, wherein the control circuitry includes control circuitry of a user equipment (UE) and the far-end communication device includes a base station.

Example 9: The apparatus of Example 8, wherein the CAZAC sequence is a cyclically shifted version of CAZAC sequences assigned to other UEs communicating with the base station.

Example 10: The apparatus according to any one of Examples 1-7, wherein the control circuitry includes control circuitry of a cellular base station, and the far-end communication device includes a user equipment (UE).

Example 11: The apparatus of Example 10, wherein: the cellular base station has base sequences corresponding to different possible DMRS lengths assigned thereto, the base sequences different from base sequences assigned to other base stations; and the CAZAC sequence is one of the base sequences assigned to the cellular base station.

Example 12: The apparatus according to any one of Examples 1-11, wherein the control circuitry is configured to engage in time division duplex (TDD) communications with the far-end communication device.

Example 13: An apparatus for a communication device, including: control circuitry configured to operably couple to one or more communication elements, the control circuitry configured to: process a demodulation reference signal (DMRS) received from a far-end communication device through one or more communication elements of the communication device; perform a Fourier transform on the received DMRS to obtain a resulting signal; use the resulting signal as a reference to demodulate orthogonal frequency division multiplexing (OFDM) symbols received from the far-end communication device; and perform a minimum mean squares estimation (MMSE) channel estimation on the resulting signal to estimate a communication channel between the communication device and the far-end communication device, wherein the MMSE channel estimation takes into account that the DMRS was generated from an appended constant amplitude zero-autocorrelation (CAZAC) sequence including zeros appended to a CAZAC sequence.

Example 14: The apparatus of Example 13, wherein the control circuitry includes a non equal weight filter configured to process the OFDM symbols received from the far-end communication device as at least part of the MMSE channel estimation.

Example 15: The apparatus according to any one of Examples 13 and 14, wherein the control circuitry is configured to, after channel equalization, remove guard interval (GI) interference resulting from GIs of the OFDM signals.

Example 16: The apparatus of Example 15, wherein the control circuitry is configured to remove the GI interference with an iterative channel estimation algorithm using previously determined channel estimates.

Example 17: The apparatus according to any one of Examples 13-16, wherein the control circuitry is configured to de-map subcarriers of the resulting signal.

Example 18: The apparatus according to any one of Examples 13-17, wherein the resulting signal is a frequency domain interpolated Zadoff-Chu sequence.

Example 19: The apparatus according to any one of Examples 13-18, wherein the control circuitry is control circuitry for a user equipment (UE), and the far-end communication device includes a cellular base station.

Example 20: The apparatus according to any one of Examples 13-18, wherein the control circuitry is control circuitry for a cellular base station, and the far-end communication device includes a user equipment (UE).

Example 21: An apparatus for a user equipment (UE), including: control circuitry configured to: generate an appended Zadoff-Chu (ZC) sequence including a ZC sequence with zeros appended thereto; spread the appended ZC sequence to obtain a frequency domain interpolated ZC sequence; determine an inverse discrete Fourier transform (IDFT) of the frequency domain interpolated ZC sequence to generate a demodulation reference signal (DMRS) for coherent demodulation of orthogonal frequency division multiplexing (OFDM) symbols transmitted by the UE to a cellular base station; and cause the DMRS to be transmitted through a cellular data network to the cellular base station.

Example 22: The apparatus of Example 21, wherein the DMRS is a guard interval (GI) DMRS.

Example 23: The apparatus of Example 21, wherein the DMRS is a zero-tail DMRS.

Example 24: The apparatus according to any one of Examples 21-24, wherein the control circuitry is configured to spread the appended ZC sequence by determining a discrete Fourier transform (DFT) of the ZC sequence.

Example 25: A method of operating a communication device, the method including: generating an appended constant amplitude zero-autocorrelation waveform (CAZAC) sequence including a CAZAC sequence with zeros appended thereto; determining a discrete Fourier transform (DFT) of the appended CAZAC sequence to obtain a frequency domain interpolated CAZAC sequence; determining an inverse discrete Fourier transform (IDFT) of the frequency domain interpolated CAZAC sequence to generate a demodulation reference signal (DMRS) for coherent demodulation of orthogonal frequency division multiplexing (OFDM) symbols; and causing communication elements of the communication device to transmit the DMRS through a cellular data network to a far-end communication device.

Example 26: The method of Example 25, further including adding a guard interval (GI) sequence to the DMRS before causing the communication elements to transmit the DMRS through the cellular data network.

Example 27: The method according to any one of Examples 25 and 26, further including mapping the frequency domain interpolated CAZAC sequence into a plurality of subcarriers.

Example 28: The method according to any one of Examples 25-27, wherein generating an appended CAZAC sequence including a CAZAC sequence with zeros appended thereto includes generating an appended Zadoff-Chu sequence.

Example 29: The method according to any one of Examples 25-28, further including determining a length of a guard interval of the OFDM symbols based, at least in part, on an expected delay spread of a communication channel between the one or more communication elements and the far-end communication device.

Example 30: The method of Example 29, further including determining a length of the CAZAC sequence to be a largest prime number such that:

$$\frac{N \times N_{SEQ}}{M} \leq N - N_{GI},$$

where N is a number of samples in each of the OFDM symbols, M is a length of the appended CAZAC sequence, and NGI is a determined length of the guard interval of the OFDM symbols.

Example 31: The method according to any one of Examples 29 and 30, further including dynamically modifying the length of the guard interval as the expected delay spread of a the communication channel changes.

Example 32: The method according to any one of Examples 25-31, wherein operating a communication device includes operating a User Equipment (UE) communicating with a cellular base station.

Example 33: The method of Example 32, wherein generating an appended CAZAC sequence including a CAZAC sequence with zeros appended thereto includes the generating the appended CAZAC sequence including a cyclically shifted version of CAZAC sequences assigned to other UEs communicating with the cellular base station.

Example 34: The method according to any one of Example 25-31, wherein operating a communication device includes operating a cellular base station communicating with one or more user equipment (UEs).

Example 35: The method of Example 34, further including operating with base sequences corresponding to different possible DMRS lengths assigned thereto, the base sequences different from base sequences assigned to other base stations, wherein the CAZAC sequence is one of the base sequences assigned to the cellular base station.

Example 36: The method according to any one of Examples 25-35, further including engaging in time division duplex (TDD) communications with the far-end communication device.

Example 37: A method of operating a communication device, the method including: processing a demodulation reference signal (DMRS) received from a far-end communication device through one or more communication elements of the communication device; performing a Fourier transform on the received DMRS to obtain a resulting signal; using the resulting signal as a reference to demodulate orthogonal frequency division multiplexing (OFDM) symbols received from the far-end communication device; and performing a minimum mean squares estimation (MMSE) channel estimation on the resulting signal to estimate a communication channel between the communication device and the far-end communication device, taking into account that the DMRS was generated from an appended constant amplitude zero-autocorrelation (CAZAC) sequence including zeros appended to a CAZAC sequence.

Example 38: The method of Example 37, wherein performing an MMSE channel estimation includes processing the OFDM symbols received from the far-end communication device with a non equal weight filter.

Example 39: The method according to any one of Examples 37 and 38, further including removing guard interval (GI) interference resulting from GIs of the OFDM signals after channel equalization.

Example 40: The method of Example 39, wherein removing GI interference includes removing the GI interference with an iterative channel estimation algorithm using previously determined channel estimates.

Example 41: The method according to any one of Examples 37-40, further including de-mapping subcarriers of the resulting signal.

Example 42: The method according to any one of Examples 37-41, wherein performing a Fourier transform on the received DMRS to obtain a resulting signal includes obtaining the resulting signal including a frequency domain interpolated Zadoff-Chu sequence.

Example 43: The method according to any one of Examples 37-42, wherein operating a communication device includes operating a user equipment (UE), wherein the far-end communication device includes a cellular base station.

Example 44: The method according to any one of Example 37-42, wherein operating a communication device includes operating a cellular base station, wherein the far-end communication device includes a user equipment (UE).

Example 45: A method of operating a user equipment (UE), including: generating an appended Zadoff-Chu (ZC) sequence including a ZC sequence with zeros appended thereto; spreading the appended ZC sequence to obtain a frequency domain interpolated ZC sequence; determining an inverse discrete Fourier transform (IDFT) of the frequency domain interpolated ZC sequence to generate a demodulation reference signal (DMRS) for coherent demodulation of orthogonal frequency division multiplexing (OFDM) symbols transmitted by the UE to a cellular base station; and causing the DMRS to be transmitted through a cellular data network to the cellular base station.

Example 46: The method of Example 45, further including adding a guard interval (GI) sequence to the DMRS before causing the DMRS to be transmitted.

Example 47: The method of Example 45, wherein causing the DMRS to be transmitted includes causing the DMRS to be transmitted with a zero-tail without adding a guard interval (GI).

Example 48: The method according to any one of Examples 45-47, wherein spreading the appended ZC sequence includes spreading the appended ZC sequence by determining a discrete Fourier transform (DFT) of the ZC sequence.

Example 49: A non-transitory computer-readable storage medium including computer-readable instructions stored thereon, the computer-readable instructions configured to instruct a processor to perform the method according to any one of Examples 25-48.

Example 50: A means for performing the method according to any one of Examples 25-48.

Example 51: A method of wireless communications, including communication between a user equipment (UE) and a base station (BS), including generating a demodulation reference symbol (DMRS), and using, by the UE, the generated DMRS for coherent demodulation of guard interval (GI) discrete Fourier transform (DFT) spread (s) orthogonal frequency-division multiplexed (OFDM) (together, GI-DFT-s-OFDM) symbols or zero-tail (ZT)-DFT-s-OFDM symbols.

Example 52: A method of wireless communications, including a time division duplex (TDD) communication between a BS and a UE, including generating DMRS, and using, by the BS, the generated DMRS for coherent demodulation of GI-DFT-s-OFDM or ZT-DFT-s-OFDM symbols.

Example 53: The method according to either one of Examples 51 and 52, or some other example herein, wherein a sequence is generated in time-domain and appended with zeros to form input to a DFT-spreader as part of reference signal generation.

Example 54: The method of Example 53 or some other example herein, wherein Zadoff-Chu (ZC) sequences are generated in time-domain and appended with zeros, as input to the DFT-spreader.

Example 55: The method of Example 54 or some other example herein, wherein the interpolated ZC sequence, generated by passing the time domain sequence of example 4 through a DFT-spreader, is used as the reference for demodulation at the receiver.

Example 56: The method of Example 54 or some other example herein, wherein for downlink, different base stations are assigned different base sequences of each possible DMRS length.

Example 57: The method of Example 54 or some other example herein, wherein for uplink, different UEs are assigned cyclically shifted and cyclically extended versions of the same base sequence.

Example 58: An apparatus to construct and transmit the signal detailed in Examples 51, 52, 53, and 54 which is part of a UE or BS implementation, which includes the following: a. A block which generates the appropriate ZC sequence and inserts the correct number of zeros; b. A block implementing DFT-spreading to form an interpolated ZC sequence in the frequency domain, and an inverse discrete Fourier transform (IDFT) block to form a time-domain signal.

Example 59: An apparatus to receive the signal detailed in Examples 51, 52, 53, and 54 which is part of a UE or BS implementation, which includes the following: a. A minimum mean square estimator (MMSE) using non-equal weight filter to process the received signal in the frequency domain; b. A method to remove the interference caused by the GI sequence post-equalization; and c. An iterative channel estimator that performs MMSE channel estimation and GI sequence removal.

Example 60: The method of any one of Examples 51-57 or some other example herein, further including a method to remove the interference caused by a GI sequence post-equalization.

Example 61: The method of any one of Examples 51-60, wherein the method is performed by a UE or BS, or one or more components or circuitry thereof.

Example 62: An apparatus including: a module to generate a DMRS, a module to generate an appropriate ZC sequence and insert the correct number of zeros therein, a module to implement DFT-spreading to interpolate the ZC sequence in the frequency domain, and a module to perform IDFT to form a time-domain signal, wherein the apparatus generates DMRS for coherent demodulation of GI-DFT-s-OFDM or ZT-DFT-s-OFDM symbols in relation to a signal.

Example 63: The apparatus of Example 62, further including: a module to perform minimum mean square estimation (MMSE) using non-equal weight filter to process the signal in the frequency domain, and an iterative channel estimator that performs MMSE channel estimation and GI sequence removal.

Example 64: The apparatus of any one of Examples 62-63, wherein the apparatus is in a UE or BS.

Example 65: The apparatus of any one of Examples 62-64, wherein sequences generated by the module to generate an appropriate ZC sequence are input to the module to implement DFT-spreading.

Example 66: The apparatus of any one of Examples 62-65, wherein output from the module to implement DFT-spreading to interpolate the ZC sequence in the frequency domain is used as a reference for demodulation at a receiver of the signal.

Example 67: The apparatus of any one of Examples 62-66, wherein for downlink, different base stations are assigned different base sequences of each possible DMRS length.

Example 68: The apparatus of any one of Examples 62-66, wherein for uplink, different UEs are assigned cyclically shifted and cyclically extended versions of the same base sequence.

Example 69: An apparatus including means to perform one or more elements of a method described in or related to any of Examples 51-60, or any other method or process described herein.

Example 70: One or more non-transitory computer-readable media including instructions to cause an electronic device, upon execution of the instructions by one or more processors of the electronic device, to perform one or more elements of a method described in or related to any of Examples 51-60, or any other method or process described herein.

Example 71: may include an apparatus including logic, modules, and/or circuitry to perform one or more elements of a method described in or related to any of examples 51-60, or any other method or process described herein.

Example 72: A method, technique, or process as described in or related to any of Examples 51-60, or portions or parts thereof.

Example 73: An apparatus including: one or more processors and one or more computer readable media including instructions that, when executed by the one or more processors, cause the one or more processors to perform the method, techniques, or process as described in or related to any of Examples 51-60, or portions thereof.

Example 74: A method of communicating in a wireless network as shown and described herein.

Example 75: A system for providing wireless communication as shown and described herein.

Example 76: A device for providing wireless communication as shown and described herein.

Example 77: The apparatus according to any one of Examples 62-68, wherein the modules are implemented in at least one of baseband circuitry and RF circuitry.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure, as contemplated by the inventors.

What is claimed is:

1. A non-transitory computer-readable storage medium, the computer-readable storage medium including instructions that when executed by a processor of a communication device, cause the processor to:
    generate an appended constant amplitude zero-autocorrelation waveform (CAZAC) sequence including a CAZAC sequence with zeros appended thereto, wherein a length $N_{SEQ}$ of the CAZAC sequence used in the appended CAZAC sequence is determined by selecting a largest prime number such that:

$$\frac{N \times N_{SEQ}}{M} \leq N - N_{GI},$$

where N is a number of samples in orthogonal frequency-division multiplexing (OFDM) symbols, M is a length of the appended CAZAC sequence, and $N_{GI}$ is a length of a guard interval of the OFDM symbols;
    determine a discrete Fourier transform (DFT) of the appended CAZAC sequence to obtain a frequency domain interpolated CAZAC sequence;
    determine an inverse discrete Fourier transform (IDFT) of the frequency domain interpolated CAZAC sequence to generate a demodulation reference signal (DMRS) for coherent demodulation of orthogonal frequency-division multiplexing (OFDM) symbols;
    add the guard interval to the DMRS, the guard interval comprising a vector of zeros and a guard interval sequence; and
    cause communication elements of the communication device to transmit the DMRS through a cellular data network to a far-end communication device.

2. The non-transitory computer-readable storage medium of claim 1, wherein the instructions further cause the processor to map the frequency domain interpolated CAZAC sequence into a plurality of subcarriers.

3. The non-transitory computer-readable storage medium of claim 1, wherein the CAZAC sequence is a Zadoff-Chu sequence.

4. The non-transitory computer-readable storage medium of claim 1, wherein the instructions further cause the processor to determine a length of the guard interval of the OFDM symbols based, at least in part, on an expected delay spread of a communication channel between the communication elements and the far-end communication device.

5. The non-transitory computer-readable storage medium of claim 1, wherein the instructions further cause the processor to dynamically modify a length of the guard interval as an expected delay spread of a communication channel changes.

6. The non-transitory computer-readable storage medium of claim 1, wherein the communication device comprises a user equipment (UE) and the far-end communication device comprises a base station, and wherein the CAZAC sequence is a cyclically shifted version of CAZAC sequences assigned to other UEs communicating with the base station.

7. The non-transitory computer-readable storage medium of claim 1, wherein the communication device comprises a cellular base station and the far-end communication device comprises a user equipment (UE), and wherein:
    the cellular base station has base sequences corresponding to different possible DMRS lengths assigned thereto, the base sequences different from base sequences assigned to other base stations; and
    the CAZAC sequence is one of the base sequences assigned to the cellular base station.

8. The non-transitory computer-readable storage medium of claim 1, wherein the instructions further cause the processor to engage in time division duplex (TDD) communications with the far-end communication device.

9. A method for a communication device, comprising:
    processing a demodulation reference signal (DMRS) received from a far-end communication device;
    performing a Fourier transform on the received DMRS to obtain a resulting signal;
    using the resulting signal as a reference to demodulate orthogonal frequency-division multiplexing (OFDM) symbols received from the far-end communication device; and
    performing a minimum mean squares estimation (MMSE) channel estimation on the resulting signal to estimate a communication channel between the communication device and the far-end communication device,
    wherein the MMSE channel estimation takes into account that the DMRS was generated from an appended constant amplitude zero-autocorrelation (CAZAC) sequence including zeros appended to a CAZAC sequence, wherein a length $N_{SEQ}$ of the CAZAC sequence used in the appended CAZAC sequence is determined by selecting a largest prime number such that:

$$\frac{N \times N_{SEQ}}{M} \leq N - N_{GI},$$

where N is a number of samples in orthogonal frequency-division multiplexing (OFDM) symbols, M is a length of the appended CAZAC sequence, and $N_{GI}$ is a length of a guard interval of the OFDM symbols; and
        wherein performing the MMSE channel estimation on the resulting signal comprises, after channel equalization, removing guard interval interference resulting from GIs of the OFDM signals.

10. The method of claim 9, further comprising processing the OFDM symbols received from the far-end communication device using a non-equal weight filter as at least part of the MMSE channel estimation.

11. The method of claim 9, further comprising:
    removing the GI interference with an iterative channel estimation algorithm using previously determined channel estimates.

12. The method of claim 9, further comprising de-mapping subcarriers of the resulting signal.

13. The method of claim 9, wherein the resulting signal is a frequency domain interpolated Zadoff-Chu sequence.

14. A method for a user equipment (UE), the method comprising
generating an appended Zadoff-Chu (ZC) sequence including a ZC sequence with zeros appended thereto, wherein a length $N_{SEQ}$ of the ZC sequence used in the appended ZC sequence is determined by selecting a largest prime number such that:

$$\frac{N \times N_{SEQ}}{M} \leq N - N_{GI},$$

where N is a number of samples in orthogonal frequency-division multiplexing (OFDM) symbols, M is a length of the appended CAZAC sequence, and $N_{GI}$ is a length of a guard interval of the OFDM symbols;
spreading the appended ZC sequence to obtain a frequency domain interpolated ZC sequence;
determining an inverse discrete Fourier transform (IDFT) of the frequency domain interpolated ZC sequence to generate a demodulation reference signal (DMRS) for coherent demodulation of orthogonal frequency-division multiplexing (OFDM) symbols transmitted by the UE to a cellular base station;
adding the guard interval to the DMRS, the guard interval comprising a vector of zeros and a guard interval sequence; and
causing the DMRS to be transmitted through a cellular data network to the cellular base station.

15. The method of claim 14, further comprising spreading the appended ZC sequence by determining a discrete Fourier transform (DFT) of the ZC sequence.

* * * * *